Feb. 22, 1966  E. A. MEYER  3,235,902
PIVOT CLAMP MOUNTING
Filed Sept. 26, 1963
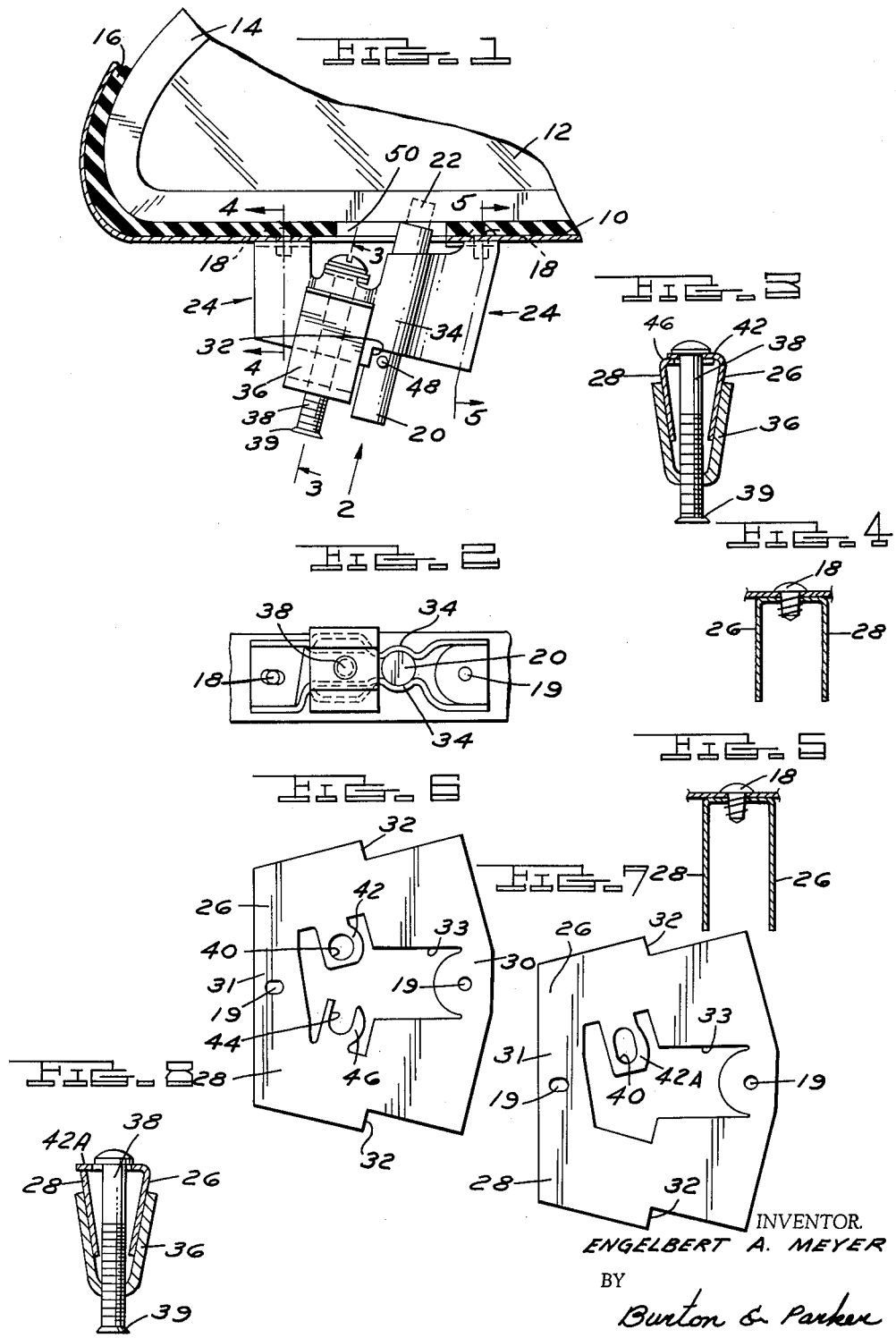
INVENTOR.
ENGELBERT A. MEYER
BY
Burton & Parker
ATTORNEYS United States Patent Office 3,235,902
Patented Feb. 22, 1966

3,235,902
PIVOT CLAMP MOUNTING
Engelbert A. Meyer, Union Lake, Mich., assignor to Chicago United Products Company, Inc., Detroit, Mich., a corporation of Michigan
Filed Sept. 26, 1963, Ser. No. 311,875
8 Claims. (Cl. 16—140)

This invention relates to a pivot mounting of the friction clamp type, and particularly to a mounting of the character used for swinging wing ventilator windows in closed automobile bodies, and for other similarly supported swingable panels or the like, and also relates to an improved pivot clamp body for such a mounting and to an improved shape of sheet metal blank from which such body may be formed.

An object is the provision of a pivot clamp mounting of the character described which is of a simple rugged inexpensive construction and supports the swingable panel or window properly for ready swinging adjustable movement and suitably retains the same to positions to which it has been adjusted.

Another object is the provision of a pivot clamp mounting as specified wherein the construction and arrangement is such that adjustment may be readily made without tearing down or otherwise disassembling the structure, such adjustment being that which is required to vary the frictional tension maintained by the clamp on the swinging pivotal movement and which holds the swingable window or panel at adjusted positions.

A further object consists in the employment of a pivot clamp body for the mounting which body is formed of sheet metal and is so shaped and constructed as to provide a support for the swingable panel or window pivot pin, and is so shaped and constructed as to so support the adjustment screw which is operable to vary the frictional clamping tension upon the pivot pin that such screw is readily accessible to receive a tool whereby the screw may be actuated to vary the frictional clamping tension upon the pivot pin.

Another object is the provision of a sheet metal body as described which body is formed of a sheet metal blank that is so shaped as to be capable of being bent into the desired shape to form the body, and which blank shape is such as to reduce to the minimum the amount of sheet metal wasted in the forming of the blank and is also so shaped as to result in the formation of a body having those parts which take the strain of attachment or operation formed in a particularly strong and rugged manner.

Other objects, advantages, and meritorious features will more fully appear from the following description, claims, and accompanying drawings wherein:

FIG. 1 is a fragmentary side elevation of the pivot clamp mounting showing a portion of the swingable inner window in cross section;

FIG. 2 is an end elevation of the pivot clamp mounting looking upwardly thereon and showing a fragment of the window frame in plan;

FIG. 3 is an upright sectional view taken on the line 3—3 of FIG. 1;

FIG. 4 is a vertical sectional view taken on the line 4—4 of FIG. 1;

FIG. 5 is a vertical sectional view taken on the line 5—5 of FIG. 1;

FIG. 6 is a plan of the blank used to form the body shown in the first five figures of the drawing;

FIG. 7 is a plan of a modified form of blank;

FIG. 8 is a view similar to FIG. 3 being a section through a pivot clamp body formed from the modified shape of blank.

It is common practice in many models of closed automobile bodies to provide wing ventilator windows which are swingably supported so as to be swung from a closed to various partially open positions and held at these adjusted partially open positions by frictional tension maintained on one of the pivotal supports of the window. Such pivot clamp mountings are also provided for other swingably supported panels and this invention is applicable to such mountings wherever they may be used. One of the desirable features of my improved pivot clamp mounting is that it is readily accessible for adjustment to vary the frictional tension imposed on the pivotal support to maintain it at adjusted position.

FIG. 1 shows my improved pivot clamp mounting secured in place to the stationary window frame 10 within which is supported a swingable window pane 12 carried by a sash 14. Such windows are commonly used in many models of automobile closed bodies. My pane supporting sash is swingable within the window opening against a shock absorbing weather strip such as rubber or the like indicated as 16. This entire assembly is carried by the frame 10. My improved pivot clamp mounting is secured to the frame 10 by screws 18 as shown.

The pivot pin which is secured to the window is indicated as 20. It has a squared end 22 that is connected with the window sash in a conventional manner to rotate therewith. This pin 20 is frictionally supported within the sheet metal body 24 of the pivot clamp mounting as shown in FIGS. 1 and 2.

The pivot clamp body 24 is formed from a sheet metal blank shown in plan in FIG. 6. Such blank comprises side portions 26 and 28 disposed on opposite sides of an intermediate portion which becomes a bight portion consisting of two sections 30 and 31 when the blank is bent into the channel shape 24 shown in FIGS. 1 through 5.

It will be noted that the blank shown in FIG. 6 is generally somewhat rectangular in shape. The two opposite side portions 26 and 28 exhibit shoulders 32 for a purpose hereafter set forth. This blank is cut out through the intermediate or bight portion as at 33, FIG. 6, between its side wall portions as illustrated. Such cutout extends down into the two side wall portions as shown adjacent to the bight portion 31 as hereinafter described.

The two bight sections 30 and 31 are each provided with an aperture 19 through which the screws 18 heretofore referred to are extended to secure the body 24 to the frame 10 as shown in FIG. 1. The side walls 26 and 28 of the body are deformed as shown at 34, FIGS. 1 and 2, to form a tubular seat or recess adapted to receive the pivot pin 20 as shown in FIGS. 1 and 2. This pivot pin being secured as at 22 to the window sash is clamped by the deformations 34 of the side walls 26 and 28 to frictionally grip the pivot pin.

The side walls of the body are tensioned outwardly into substantial parallelism and are resistingly held inwardly by clamping means against the pivot pin. This frictional gripping of the side walls against the pivot pin is accomplished by a U-shaped, or more properly V-shaped clamp element 36 which is threaded upon an adjustment screw 38 as shown in FIGS. 1 and 3. Through the use of a screw driver received within the kerf of the head of the screw 38, such screw may be rotated to draw the clamp up over the side walls 26 and 28 of the body gripping such side walls about the pivot pin 20. The gripping engagement of the side walls about the pivot pin 20 may be so adjusted by rotating the screw as to take up for wear and to insure that the swingable window will be maintained frictionally at any position to which it is adjusted against accidental dislocation while permitting it to be manually moved to the closed position or varying open positions.

The screw 38 may be a conventional screw. It is rotatably supported within an aperture 40 formed within a tab 42 carried by said wall 26 and an opening 44 formed in tab 46 carried by the wall 28. When the blank is folded into the channel shape of the body 24 as shown on the first five figures of the drawing, these two tabs are overlapped as shown in FIG. 3 and constitute the rotatable support for adjustment of the screw.

It will be noted that the screw may be upset at its end as at 39, FIGS. 1 and 3, if desired to insure it not coming out. It will also be noted that the pivot pin is provided with a stop pin 48, FIG. 1, which is adapted to engage shoulders 32 to limit the swingable movement of the window.

It will be observed that the frame 10 and the cushion weather strip 16 are cut away as at 50, FIG. 1, so as to expose the head of the adjustment screw 38 to receive a screw driver so that the tension of the side walls of the body against the pivot pin 20 may readily be adjusted without any disassembly of the structure. This is an advantage in servicing the device.

It will also be observed that the tabs 42 and 46 which form extensions of the side walls 26 and 28 into the cutout 33 are brought into overlapping relationship as shown in FIG. 3 to rotatably support the adjustment screw 38. Due to the fact that these tabs 42 and 46 and the bridging anchoring bight portions 30 and 31 are all formed within the interior of the blank, such blank is shaped so as to minimize any wastage of metal as might otherwise occur if these supporting and securing parts were formed from projections extending outwardly from the body of the blank.

FIG. 7 illustrates a modified form of blank in which the adjustment screw support is formed from a single tab indicated as 42A. This tab is longer than the tab 42 shown in FIG. 6. The tab 46 shown in FIG. 6 is eliminated. The tab 42A extends over and overhangs the margin of the cutout in wall 28 when the blank is folded up into channel shape as shown in the cross sectional view of FIG. 8.

It will also be apparent that due to the opening through the frame 10 above the pivot pin 20 and above the adjustment screw 38 and the fact that the intermediate or bight portion which connects the two side walls 26 and 28 of the blank is cut away between the bight sections 30 and 31, the space between the side walls and between these bight sections is completely exposed for easy access to the adjustment screw for its rotation.

What I claim is:

1. A pivot clamping mounting assembly comprising, in combination, a channel shaped sheet metal body having opposed side walls connected by a bridging bight portion, said bridging bight portion cut away intermediate the opposed ends thereof forming a cutout extending between the side walls intermediate the opposed ends of the bight portion, one of such side walls provided with an extension bent into the cutout toward the opposed side wall and apertured to receive rotatably therethrough an adjustment screw, an adjustment screw mounted within said aperture and extending through the space between the side walls of the body and beyond the opposed edges of the side walls, a V-shaped clamp threaded upon the screw beyond the edges of such side walls, said clamp embracing the opposite edge portions of the side walls to be drawn thereover upon rotation of the screw to draw the side walls toward each other or permit said side walls to spread apart, said side walls having opposed wall portions adapted to grip a pivot pin extending through the cutout in the bight portion generally in a direction parallel to the adjustment screw.

2. A pivot clamping mounting assembly comprising, in combination, a channel shaped sheet metal body having opposed side walls connected by a bridging bight portion, said bight portion apertured to receive an adjustment screw therethrough, an adjustment screw mounted within the aperture through the bight portion and extending linearly through the space between the side walls of the body, a V-shaped clamp threaded upon said screw beyond the opposite free edges of the side walls embracing said edge portions of the side walls and adapted to be drawn thereover to urge said side walls toward each other or to be released to permit said side walls to spread apart upon determined rotation of the screw, said side walls provided with opposed wall portions adapted to embrace a pivot pin disposed therebetween and extending generally parallel to the adjustment screw, and said bight portion cut away in line with said pivot pin embracing portion of the side walls whereby a portion of the pivot pin may extend through said bight portion.

3. A pivot clamping mounting assembly comprising, in combination, a channel shaped sheet metal body having opposed side walls connected by a bridging bight portion, said bight portion provided with a cutout intermediate the opposed ends thereof and which cutout extends between said side walls and partially therethrough, one of said side walls provided with an extension of a bight-like character projecting toward the opposed side wall and provided with an aperture to receive an adjustment screw, an adjustment screw mounted in said aperture and extending lengthwise through the space between the opposed side walls, a clamp threaded on the screw embracing the opposed edge portions of the opposed side walls and adapted to be drawn thereover or released therefrom upon determined rotation of the screw, said opposed side walls having opposed wall areas adjacent to the cutout deformed to embrace a pivot pin extending rotatably through the cutout.

4. A pivot clamping mounting assembly as defined in claim numbered 3 characterized in that each of the opposed side walls is provided with an extension of a bight-like character extending toward the opposed side wall and which extensions overlap each other and are apertured to receive the adjustment screw therethrough.

5. A pivot clamping mounting assembly as defined in claim numbered 3 characterized in that the opposed wall areas which are deformed to embrace the pivot pin and are adjacent to the cutout extend away from the cutout to the outer opposed free edges of the side walls.

6. In combination with a panel pivotally supported within a frame for swingable movement to open and close said frame opening, said frame having an aperture therethrough generally in line with the plane of the panel when the panel is in the closed position within the frame, said panel having a pivot pin extending rotatably through the aperture in the frame, a pivot mounting channel shaped body having opposed side walls connected by a bridging bight portion, said bridging bight portion of the body connected with the frame, said bridging bight portion having an aperture therethrough opposed to the aperture through the frame, said pivot pin of the panel extending rotatably through the apertures in the frame and the aperture in the portion of the body and into the space between the two side walls of the body, said side walls of the body having opposed areas adapted to grippingly engage said pivot pin, an adjustment screw supported within the channel shaped body to extend rotatably through a bight portion of the body into the space between the body side walls, and means threadingly coupling the adjustment screw with the opposed side walls of the body to urge the opposed areas of the side walls which grippingly engage the pivot pin towards the pivot pin or to release the same to move away from the pin upon determined rotation of the adjustment screw.

7. The construction as defined in claim numbered 6 characterized in that the head of the adjustment screw is exposed to be engaged by a tool extending through the aperture in the frame, and the side walls of the body are normally tensioned away from the pivot pin that extends therebetween.

8. A pivot mounting for a swingable panel comprising, in combination, a frame for the panel, a panel swingably mounted within the frame, said frame having a transverse opening therethrough in line with the panel when the panel is at the closed position within the frame, a channel shaped clamping body having a bight portion connected with the frame and with the side walls of the body extending downwardly away from the frame, said bight portion of the body having an aperture therethrough registering with the aperture through the frame, said panel having a pivot pin extending through the aperture through the frame and through the aperture through the bight portion of the body into the space between the side walls of the body, said side walls of the body having opposed areas adapted to grippingly engage the pivot pin extending therebetween, an adjustment screw rotatably supported within the bight portion of the body with the shank of the screw extending between the side walls of the body and having means coupled therewith to urge the side walls toward each other to draw portions thereof grippingly against the pivot pin or to release the same for movement away from the pin, said adjustment screw having a head portion exposed to access for adjustment through the aperture in the frame.

References Cited by the Examiner
UNITED STATES PATENTS

| | | | |
|---|---|---|---|
| 2,048,605 | 7/1936 | Fisher. | |
| 2,537,322 | 1/1951 | Wanzenberg | 24—263 |
| 2,968,853 | 1/1961 | McKeown | 24—263 |
| 3,009,237 | 11/1961 | Lehmeier | 29—190 |
| 3,016,602 | 1/1962 | Getzin | 29—190 |
| 3,058,714 | 10/1962 | Oliver | 248—300 |
| 3,066,903 | 12/1962 | Tinnerman | 248—300 |

FOREIGN PATENTS

| | | |
|---|---|---|
| 838,886 | 6/1960 | Great Britain. |

JOSEPH D. SEERS, *Primary Examiner.*

DONLEY J. STOCKING, *Examiner.*